June 15, 1943.  C. KYLE  2,321,756
APPARATUS FOR DRYING ACCRETED FIBROUS ARTICLES
Filed Sept. 9, 1940  2 Sheets-Sheet 1

INVENTOR.
Colin Kyle
BY Parkinson + Lane
ATTORNEYS.

Witness:
Chas. L. Koursh.

June 15, 1943. C. KYLE 2,321,756
APPARATUS FOR DRYING ACCRETED FIBROUS ARTICLES
Filed Sept. 9, 1940 2 Sheets-Sheet 2
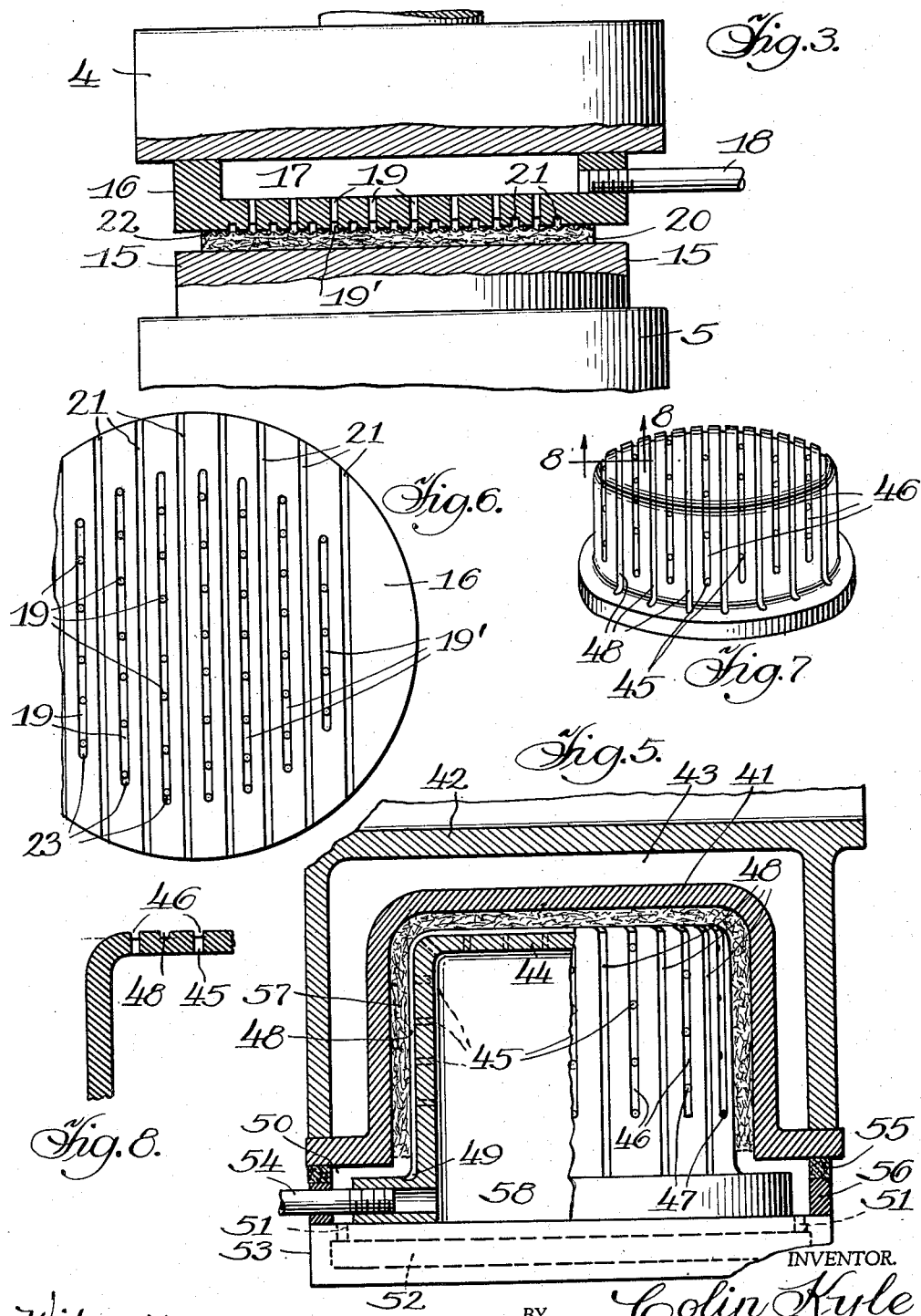

Patented June 15, 1943

2,321,756

UNITED STATES PATENT OFFICE 2,321,756

APPARATUS FOR DRYING ACCRETED FIBROUS ARTICLES

Colin Kyle, Geneva, Ill., assignor to Jesse B. Hawley, Geneva, Ill.

Application September 9, 1940, Serial No. 355,915

6 Claims. (Cl. 34—145)

This invention relates to an apparatus for drying accreted fibrous articles and more particularly to such articles as are accreted from fibrous pulp in a fibrous pulp bath.

Among the objects of my invention is to provide a novel apparatus for drying fibrous pulp articles by causing heated air or the like to flow through the interstices in the articles while wet.

Another object is to press the wet carcass between dies and at the same time drive heated air through the interstices between the fibers to heat the carcass quickly, and stopping the flow of the heated air as soon as the water is gone to prevent scorching.

A further object is to change the direction of flow of the heated air intermittently while drying the article.

A still further object is to use either pressure or vacuum or both for causing the heated air to pass through the article during the drying operation.

Another object is to provide novel means for passing the heated air through the interstices between the fibers from one pressing die only, and longitudinally through the length of the carcass and out, instead of passing it through the other die, or by forcing the heated air into the carcass from one die and out and away from the carcass through the other die as desired.

A further object is to provide a novel arrangement of grooves and openings in the die through which the heated air is passed.

Other objects, advantages and capabilities will later more fully appear.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings:

Fig. 3 is a vertical section through a modified form of pressing dies and through portions of the pressure platens.

Fig. 5 is a vertical section, with the male die partly in side elevation, of a modified form of a pair of pressing dies.

Fig. 6 is an enlarged fragmentary view of the under face of the upper die of Fig. 3.

Fig. 7 is a reduced perspective view of the male die of Fig. 5.

Fig. 8 is a fragmentary detail section taken radially on the line 8—8 of Fig. 7.

Figure 1:
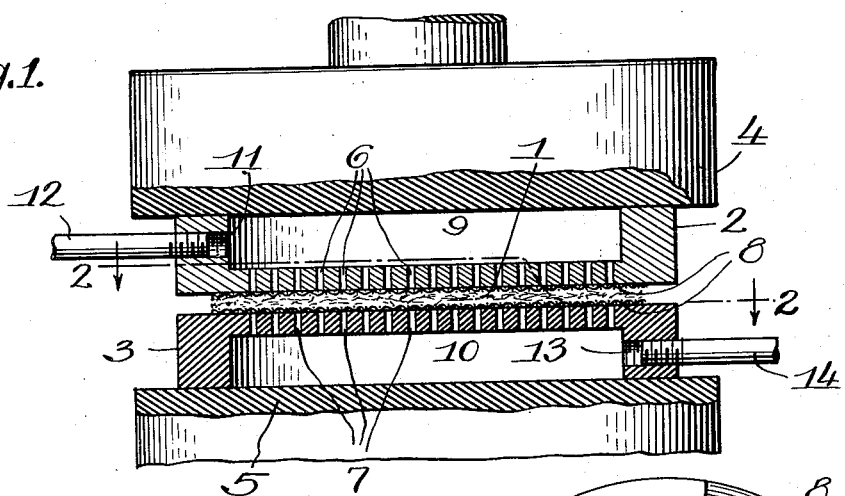
Figure 1 is a vertical sectional view through the upper and lower dies and through a portion of the means for applying pressure thereto.
Figure 2:
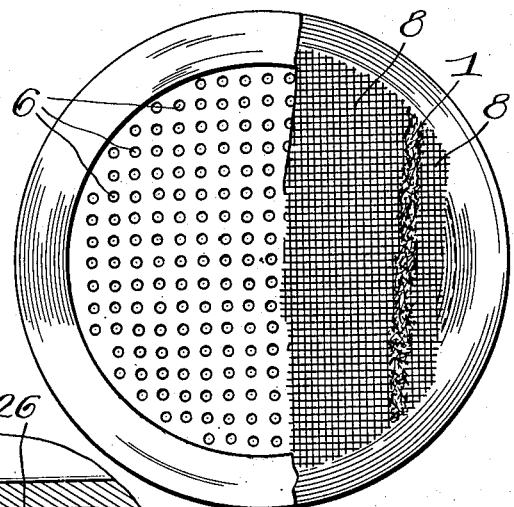
Fig. 2 is a top plan view of a portion of the upper die and showing the metal screen at the bottom face of the carcass and a portion of the lower die, this view being taken on the line 2—2 of Fig. 1.

In carrying out my invention a fibrous pulp carcass is accreted onto a porous felting form of the desired shape while immersed in a fibrous pulp bath after the manner shown in Figs. 1 and 13 in the patent to Edward C. Sloan No. 2,222,003, granted November 19, 1940, and while still wet the carcass is removed from the felting in any desired manner and, if desired, some of the excess water may be removed by suction before or after removing the carcass from the form or by pressure from a rubber bag. The wet carcass is then placed between pressing dies and pressure applied thereto, and at the same time heated air is forced either by suction or pressure (or both) through the interstices of the carcass to dry the same.

In Fig. 1 is shown a simple flat wet carcass 1 formed by accreting fibrous pulp onto a porous former while immersed in a pulp bath, the carcass 1 being pressed between the dies 2 and 3, pressure being applied to the dies by the platens 4 and 5 of any suitable press. The dies 2 and 3 are each provided with a large number of holes 6 and 7 respectively, large enough to permit a flow of heated air to freely pass therethrough. Positioned over the inner face of each of the dies is a metal screen 8 of mesh sufficiently fine to permit air to freely pass therethrough but yet prevent the larger holes from unduly marking the surface of the carcass during the pressing operation. In the form shown in Fig. 1 the dies 2 and 3 are formed with the hollow portions 9 and 10 respectively, the marginal edges of each of the dies which bear against the respective platens being of such form as to tightly fit against the face of such platen to prevent any substantial flow of air from the outside into the openings 9 and 10 except through the inlet and outlet pipes hereinafter described. The die 2 is provided in its side wall with an opening 11 into which is threaded or otherwise suitably secured a pipe 12, while in the wall of die 3 is formed an opening 13 in which is similarly mounted a pipe 14.

As soon as the wet carcass 1 is positioned between the dies heated air is introduced through one or the other of the pipes 12 and 14 and caused to flow through openings 6 or 7 in the dies and out through the other of these two pipes. The air is heated in any suitable source desired to any desired temperature. I have found that a pressure of 75 pounds per square inch exerted against the dies and a temperature of approximately 750° F. for the air passed through the dies and carcass give satisfactory results in a remarkably short time. While not limiting the invention to this particular direction of flow, the heated air is preferably passed inwardly through pipe 14 into the hollow 10 of die 3, through openings 7 in this die, through the openings in the screen 8, through the interstices between the fibers of the carcass, through the mesh of the upper screen, through the openings 6 into the hollow 9 of die 2 and thence through the outlet pipe 12, either to exhaust or reheating for re-use, or any other use that may be desired. I wish it understood that instead of passing the heated air through inlet pipe 14 and out of the outlet pipe 12, the direction of flow of the air may be reversed and it may be passed in through pipe 12 and out through pipe 14.

By heating the air while pressing the carcass, I have found that the carcass regardless of its shape or contour may be dried very quickly as compared to pressing alone and then drying afterwards. In other words, I have been able by use of this invention to dry wet fibrous carcasses in from thirty seconds to three minutes as compared with a much longer time required in drying them without the use of this invention.

Instead of using the metal screens 8, metal plates with a large number of smaller holes may be used to make the article smoother and eliminate the larger holes that would otherwise be formed on the face of the carcass or article. In applying pressure to the dies, a hydraulic or other suitable press may be used, and the pressure should be at least in excess of the pressure of the heated air. Any desired air pressure may be used with the heated air, but it is preferable that the air be heated to as high a temperature as feasible without scorching the article being pressed and dried. The heated air may be forced through the carcass either by pressure or suction or pressure in the inlet pipe and suction in the outlet pipe as desired.

In the form shown in Fig. 3, the die 15 is solid and plane on its upper surface while the die 16 is formed with the hollow portion 17 similar to the hollow 9 in Fig. 1, but in Fig. 3 the heated air is forced in through the inlet 18 and then downwardly through the holes 19 and into the interstices between the fibers in the carcass 20, and thence upwardly into the adjacent grooves 21 which latter grooves are not perforated insofar as the body of the die is concerned, the heated air passing from these grooves 21 to the edges of the die 16 and thence outwardly into the atmosphere as seen in Fig. 6. The lower face of the die 16 in Fig. 3 has applied thereto a fine mesh metal screen 22 or thin metal plate with a large number of small openings therein similar to that described in connection with Fig. 1 in order to prevent formation of ridges or corrugations in the face of the carcass.

As will be understood, in Figs. 3 and 6 the heated air under pressure will be forced in through the pipe 18 to the hollow interior 17 of the die and thence through the holes 19 and grooves 19' communicating therewith, but which latter grooves are closed at their outer ends at 23 as seen in Fig. 6. This heated air is then forced into the interstices between the fibers and finds its way into the grooves 21 and thence out through the open ends of the grooves 21. This form enables the provision of holes and grooves in the face of only one die, the other die 15 being smooth and unperforated. Fig. 6 shows the under face of the upper die.

Figure 4:
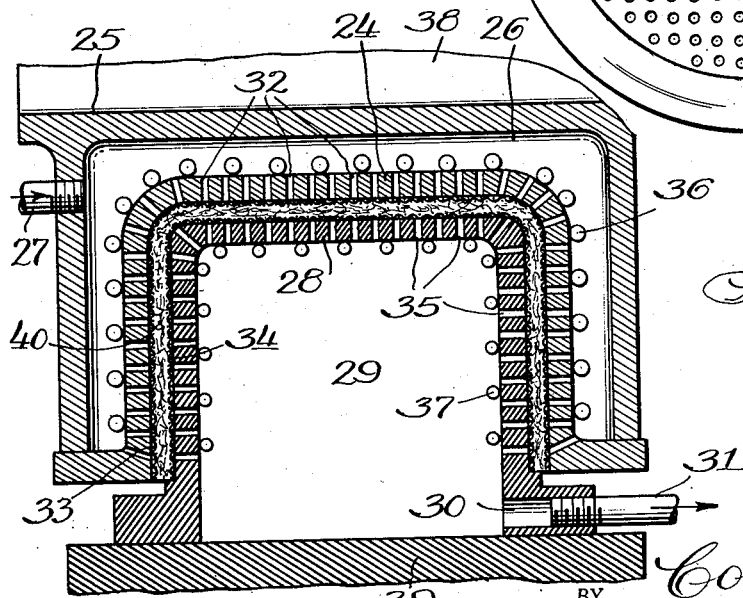
Fig. 4 is a vertical section through a modified form of pressing dies.

As shown in Fig. 4, the upper die is formed with the female portion 24 having a spaced apart outer casing 25 to provide the hollow 26 therebetween to receive the heated air which enters through inlet 27, passes through the openings in the female die, through the carcass, through the openings in the male die into the space 29 and thence outwardly through the air outlet 31, as described more fully hereafter. The casing 25, as will be understood, is rigidly secured to the female die 24 by bolts, screws or the like as desired, and removable therefrom by such bolts, screws or the like for repair or inspection. The male die 28 is hollow to provide the interior space 29 and is formed with the opening 30 to receive by screw threads or other securing means the outlet pipe 31. The female die is formed with any suitable number of holes 32 with a screen or perforated plate 33 against the inner face of the female die for a purpose similar to that of the screen 8 in the dies of Fig. 1. The outer face of the male die 28 is also provided with a similar screen 33, perforated plate or the like and for a similar purpose, and is formed with any suitable number of holes 35. The outer surface of the inner portion 24 of the female die and also the inner surface of the male die may be formed with electric heating elements 36 and 37, respectively, for heating the respective dies if desired. In other words, the heat from these electric heating elements may heat the air as it passes into and through the dies and carcass or such air may be heated beforehand and the heat thereof augmented by the heat from the electric heating elements. Pressure is applied to these dies by the press platens 38 and 39 in any suitable press.

In this form shown in Fig. 4 the heated air is passed through the inlet pipe 27 into the hollow 26 of the female die, thence through the holes 32, through the screen or perforated plate 33, through the interstices of the fibers in the carcass 40, thence through the screen or perforated plate 34, thence through the holes 35 of the male die, then through the space 29 in this die and out through the outlet pipe 31. As will be understood, this heated air in passing through the carcass will under the high temperature thereof quickly dry the carcass, which drying should be stopped before the carcass becomes scorched or discolored from the heat. Also in the dies shown in Fig. 4 the air may be passed through any suitable piping system and by suitable automatic or manual valves may be caused to first pass in one direction through the carcass and then in the other direction, this intermittent direction of flow being controlled as desired, or the flow may be continuous in one direction. The electric heating elements in Fig. 4 may be used or omitted as deemed preferable. If omitted the heat of the air will be entirely furnished from any suitable initial heating source. Also in this form pressure and suction through the dies may be combined, or the air may be forced through entirely by pressure or entirely by suction, the important thing being to force the heated air through the interstices of the article being dried so that drying may be quickly accomplished, thus saving a great deal of time.

In Fig. 5 is shown an imperforate female die 41 having fixed thereto an outer casing 42 to provide therebetween the space 43, and the inner male die 44 formed with holes 45 and grooves 46, which holes and grooves are arranged similar to those shown in Fig. 6 except that in Fig. 5 the grooves 46, due to the inner die being a male die, extend nearly to the bottom of the carcass but stopping short thereof with the closed ends 47, which grooves also pass over the top of the male die to and down the other side. Also formed in both the top and sides of the male die 44 are the unperforated grooves 48 arranged alternately with the perforated grooves 46, that is, one unperforated groove between each two perforated grooves. These unperforated grooves 48 extend to the bottom of the male die as shown at 49 so that the air may escape therefrom into the space 50, thence downwardly through the openings 51 into the hollow interior 52 of the hollow base plate 53, from which such heated air after passing through the carcass may be withdrawn either by suction or by pressure of the heated air initially introduced through the inlet pipe 54.

In order to seal the space 50 there is provided between the bottom outer edge of the female die a yielding, sealing packing 55 above a metal ring 56, the yieldable sealing packing 55 permitting up and down movement of the female die with relation to the male die, yet preventing escape of air from the space 50 between the two dies. In Fig. 5 the carcass is indicated at 57. In this form the heated air is introduced through the inlet pipe 54 into the interior space 58 of the male die, thence outwardly through the openings 45 and closed grooves 46, thence into the interstices of the carcass and from thence into the open ended grooves 48 and out, this heated air, as will be understood, thus thoroughly passing through the interstices of the fibers of the carcass during its passage from the closed side of the perforated grooves to the open ended grooves 48, and drying the carcass during its passage. It desired, the direction of flow of the air may also be reversed in this form.

Fig. 7 is a reduced view of the outer sides of the male die showing the closed perforated grooves 46 and the open ended grooves 48 in perspective.

Fig. 8 shows one form of contour at the upper outer edges of the male die and also how the perforated and unperforated grooves may pass over the top of the male die from one side to the other.

It is thus seen that I have provided novel means for quickly and efficiently drying wet accreted fibrous pulp carcasses or articles, and saving an extremely great amount of time in pressing and finishing said carcasses or articles. If desired, superheated steam may be used instead of heated air for drying the carcass down to a certain point without completely drying it and, if desired, finish the drying with heated air. The important feature of this invention broadly is to press wet fibrous pulp carcasses and at the same time drive heated air through the interstices thereof to quickly dry the same but without scorching the carcass.

In the form shown in Fig. 4 other heating means than electrical coils may be used such an a flame or the like.

Having now described my invention, I claim:

1. In apparatus for drying wet accreted fibrous pulp articles, a pair of pressing dies for pressing said article therebetween, one of said dies being hollow and having grooves in and perforations through its pressing wall, some of said grooves having closed ends and some of them having open ends, the closed-ended grooves being in communication with said perforations, the open ended grooves in said face being alternately positioned between the closed-ended grooves, and means for applying heated air through said perforations and grooves and into and through interstices between the fibers in the article being dried.

2. In apparatus for drying wet accreted fibrous pulp articles, a pair of pressing dies for pressing said article therebetween, one of said dies being hollow and having grooves in and perforations through its pressing wall, some of said grooves having closed ends and some of said grooves having open ends, the closed-ended grooves being in communication with said perforations, the open-ended grooves being alternately positioned between the closed-ended grooves, means for applying heated air through said perforations and grooves and into and through interstices between the fibers in the article being dried, and means for applying pressure to said dies during the drying operation.

3. Apparatus for drying wet accreted fibrous articles, comprising a female pressing die and a male pressing die, the male die having grooves in the acting face thereof, said male die also having perforations therethrough, some of said grooves being closed at the ends and communicating with said perforations, others of said grooves being open at the ends and free of perforations through the walls, said grooves extending over the end of the male die and along its sides, and means for introducing heated air under pressure into and along said grooves and through interstices between the fibers to dry the article.

4. In apparatus for drying wet accreted fibrous pulp articles, a pair of pressing dies, one of said dies having a hollow interior and being provided with means for introducing a heating medium thereinto, said last mentioned die having a wall formed with perforations and also having on its outer face two series of grooves, one series of said grooves having closed ends and the other series having open ends, the closed-ended grooves communicating with said perforations, the perforations and closed-ended grooves receiving the heating medium from said hollow interior and conducting it into interstices between the fibers of the article, the open-ended grooves receiving the heating medium from said interstices and leading it through said open ends to the outside.

5. In apparatus for drying wet accreted fibrous pulp articles, comprising a male pressing die and a female pressing die, said dies having opposed downwardly extending walls and opposed top walls, one of said dies having perforations therethrough and grooves on one face, said last mentioned die having means for introducing a heating medium through said perforations, into some of said grooves and into interstices between the fibers of the article being dried, and out from said interstices into the others of said grooves and out at the edge of said article.

6. In apparatus for drying wet accreted fibrous pulp articles, comprising a male pressing die and a female pressing die, said dies having opposed downwardly extending walls and opposed top walls, one of said dies having perforations therethrough and grooves on one face, said last mentioned die having means for introducing a heating medium through said perforations, into some of said grooves and into interstices between the fibers of the article being dried, and out from said interstices into the others of said grooves and out at the edge of said article, said grooves being arranged in two series, the grooves of one series each having closed ends stopping short of the edge of the article being dried and being connected with the perforations and the grooves of the other series, each having open ends extending to the edge of the article and being disconnected from said perforations.

COLIN KYLE.